JAMES E. WEBB
ADMINISTRATOR OF THE NATIONAL
AERONAUTICS AND SPACE ADMINISTRATION

COMPENSATING BANDWIDTH SWITCHING TRANSIENTS
IN AN AMPLIFIER CIRCUIT

Filed July 20, 1964

INVENTOR.
LA RUE A. HOFFMAN
BY G. T. McCoy
Howard B. Scheckman
ATTORNEYS

United States Patent Office 3,389,346
Patented June 18, 1968

3,389,346 COMPENSATING BANDWIDTH SWITCHING TRANSIENTS IN AN AMPLIFIER CIRCUIT

James E. Webb, Administrator of the National Aeronautics and Space Administration, with respect to an invention of La Rue A. Hoffman, Los Angeles, Calif.
Filed July 20, 1964, Ser. No. 384,010
8 Claims. (Cl. 330—51)

ABSTRACT OF THE DISCLOSURE

A bandwidth switching arrangement for an operational amplifier-filter, which includes a resistive-capacitive feedback network, formed by a first capacitor and resistor between the input and output terminals thereof. The arrangement includes a second capacitor and a multicontact relay used, in one state, to connect the second capacitor through a resistor to ground so that the voltage across the second capacitor is substantially equal to the voltage across the first capacitor in the feedback loop. Then, when the relay is switched to a second state, the second capacitor is connected by means of the relay contacts, in parallel across the first capacitor to increase the feedback capacitance and thereby reduce the bandwidth. An increase in the input resistance of the amplifier is also incorporated to further reduce the bandwidth.

*Origin of invention*

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to FM demodulation apparatus and more particularly to phase-locked loop demodulators of the type frequently used in telemetry receivers, in which bandwidth switching may be accomplished during reception without loss of phase lock due to the occurrence of switching transients during changes in bandwidth.

There is provided by the present invention a unique technique for switching a conventional phase-locked loop demodulator circuit from a wide bandwidth condition to a narrow bandwidth condition without introducing an interfering transient. As one example of an application of the invention, it may be used in a system to measure range and range rate of an orbital communication satellite. In such an application, range measurements are accomplished by basic sidetone ranging techniques, and the range rate measurements are made by using the established principles of coherent Doppler. A phase-locked loop circuit to be used in such an application is required to have a wide bandwidth capability to improve the acquisition capabilities of the loop for receiving signals with added Doppler rate. After acquisition of the incoming signal, the signal-to-noise ratio of the loop is improved by narrowing the bandwidth of the loop while the signal is being tracked.

Switching parameters in a circuit usually results in transient conditions that override the received signal and cause loop unlocking, thereby requiring re-acquisition of the incoming signals. In an attempt to change from one bandwidth to another, previous circuits have switched resistors only; capacitors have not been used because they introduce transients that override and cause loss of the signals. However, the inability to utilize capacitors in a switching circuit has prevented the use of as narrow a bandwidth as desirable. These defects of the prior art are eliminated in the present invention by continuously charging a capacitor, which is to be added to the circuit for affecting the parameter change, at the same rate as the capacitor in the loop circuit is being charged. In addition, the actual switching is caused to occur at a zero voltage point thereby insuring that the physical act of switching a capacitor from one line to another will not cause a transient condition. That is, switching the capacitor into the loop circuit will not result in a transient condition since the capacitor is already charged to the same potential extant in the loop circuit.

Thus, there is provided by the present invention a novel use of capacitors in the bandwidth determining network, which eliminates the transients heretofore caused by capacitors. Essentially, the capacitor to be inserted in the circuit is maintained at the same voltage as the circuit. Also, a resistor is switched into the circuit to provide the inserted capacitor with the same time constant as the capacitor already in the circuit. Since the capacitor to be added to the circuit has the same potential and the same time constant as that already in the circuit, it will neither charge nor discharge and will not produce a transient.

It is therefore a principal object of the invention to provide a novel and improved filter network for use in a phase-locked loop demodulator, which may be selectively adjusted to effect changes in bandwidth, without introducing spurious transients.

Another object of the invention is to provide a novel and improved transient-free bandwidth switching circuit for use in phase-locked loop demodulators.

Still another object of the invention is to provide a novel and improved circuit for eliminating transients in an R-C filter network during changes in the network parameters produced by switching of the capacitive filter components, by maintaining capacitors at the same voltage as in the circuit into which they are to be switched.

Having in mind the defects of bandwidth switching systems of the prior art, it is an object of this invention to provide such a system which overcomes the limitations imposed by systems in which resistors only are switched to change the bandwidth.

A general object of this invention is to provide a novel and improved transient-free switching circuit for use in filter networks which overcomes disadvantages of previous means and methods heretofore intended to accomplish generally similar purposes.

Other objects of the invention will in part be obvious and will in part appear hereinafter. The invention will be understood more completely from the following detailed description, taken in conjunction with the drawings, in which.

Figure 1:
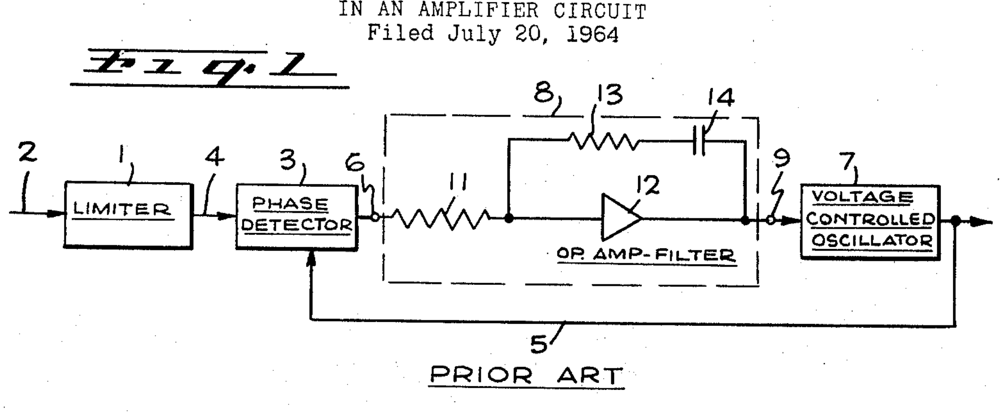
FIGURE 1 is a block diagram illustrating a phase-locked loop demodulator of the type to which the present invention may be applied.

It is to be understood that inasmuch as the conventional phase-locked loop demodulator, apart from the adjustable filter network to be described in detail hereinafter, does not constitute part of the instant invention, only so much as the structural details and operational features thereof considered to be essential for a complete understanding of this invention are described herein. The phase-lock loop as used in the demodulation of a frequency modulated (FM) signal is shown in block diagram form in FIGURE 1. This circuit comprises a limiter 1 to which an FM input signal is applied via line 2. The limiter output comprises a square-wave signal which is applied as one input to phase detector 3, via line 4. A reference frequency, appearing on line 5, is applied to the alternate input of phase detector 3. The phase detector 3 gives an output at terminal 6 dependent on the phase difference between the input signal on line 4 and the reference frequency signal obtained from voltage-controlled oscillator 7. This output at terminal 6 is amplified, filtered, and then applied to the voltage-controlled oscillator 7 to force its output frequency to follow that of the input signal appearing on line 4. The voltage applied to the voltage-controlled oscillator 7 is the modulation on the input signal 4 and this is the desired demodulated output. This demodulated output appears at terminal 9. The voltage analog output of phase detector 3 is applied to a loop filter 8. The loop filter 8 comprises a series resistor 11 in an integrator. The integrator portion comprises operational amplifier 12 and its feedback network consisting of resistor 13 and capacitor 14. An operational amplifier type of loop filter 8 could in some instances be replaced by a simple R-C network. However, since the bandwidth requirements of most applications is of the order of 10 to 50 cycles, the capacitive component would be impracticably large. An operational amplifier permits a small capacitor to be used.

The output of amplifier 12 is supplied to voltage-control oscillator 7, the output of which comprises a variable-frequency sine wave supplied via line 5 to phase detector 3.

The bandwidth of the loop is determined by the parameters of filter 8. Acquisition is facilitated under initial conditions of wide bandwidth.

Heretofore bandwidth switching has been accomplished by means of relays which switch in different values for resistors 11 and 13 since such method introduces a minimum of transient excitation which could cause loop unlocking. Loop unlocking would require re-acquisition which could not be readily accomplished under the conditions of reduced bandwidth. However, this method of the prior art is limited in the degree of bandwidth change possible while still maintaining other desirable characteristics of the loop as determined by the value of resistor 11, resistor 13 and capacitor 14. It would be desirable to change the values of resistor 11 and capacitor 14, if two parameters are to be changed, rather than the values of resistors 11 and 13, or resistor 13 and capacitor 14, since a much greater range of bandwidth change would be possible while maintaining a desirable damping factor. For example, if both resistor 11 and capacitor 14 are doubled in value, the damping factor ($\varphi$) remains constant since other parameter remains a constant:

$$\alpha\varphi K'\sqrt{\frac{C}{R_1}}$$

where:
$\varphi$ is the damping factor
K' is a constant
C is the value of capacitor 14
$R_1$ is the value of resistor 11
and bandwidth ($\beta$) is halved since:

$$\beta\alpha K''\sqrt{\frac{1}{R_1C}}$$

As mentioned hereinabove, prior attempts to switch the value of capacitor 14 resulted in the detrimental effect of causing loss of phase lock due to the introduced transient.

Figure 2:
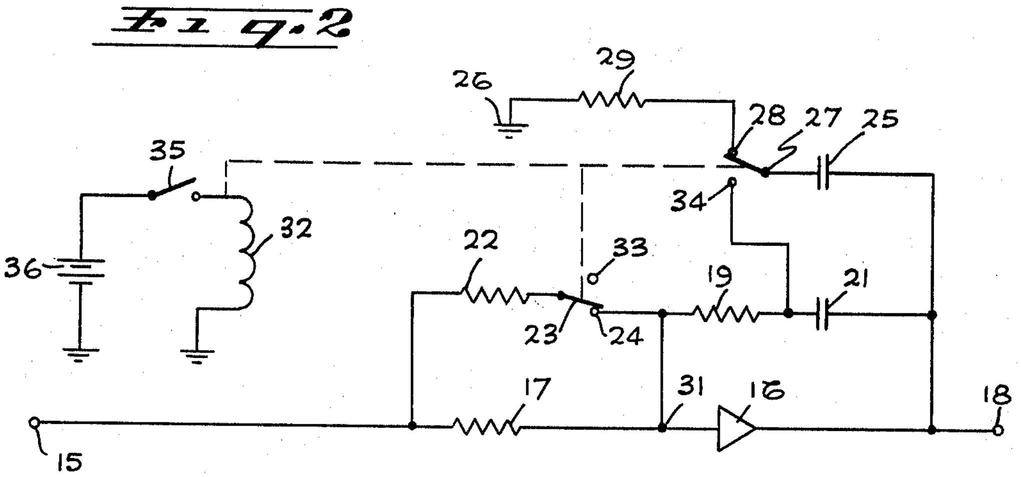
PRIOR ART FIG. 2
FIGURE 2 is a schematic diagram illustrating an adjustable bandwidth filter circuit according to the invention.

There is shown in FIGURE 2 a variable bandwidth filter according to the present invention which overcomes the difficulty inherent in prior attempts to switch the value of the capacitive element in the bandwidth determining circuit.

Referring to FIGURE 2 the output from the phase detector appears at terminal 15 and is supplied to the input of operational amplifier 16 via series resistor 17. The output of the operational amplifier 16 appears at terminal 18. The feedback network around amplified 16 comprises resistor 19 and capacitor 21.

Resistor 19 serves as a lead resistor to provide some output at high frequencies and thereby prevent oscillation. In effect, resistor 19 enables a voltage to be built up across capacitor 21 which leads the current therethrough and thereby provides a voltage thereacross prior to integration to prepare the amplifier for an incoming signal. Input series resistor 17 is normally shunted by resistor 22 through relay contacts 23 and 24. In the acquisition mode (wide bandwidth) the output (at terminal 18) is also applied to capacitor 25 which is returned to ground 26 through relay contacts 27 and 28, and resistor 29.

The value of resistor 29 is chosen such that the time constants of the combination of resistor 19 and capacitor 21 and the combination of resistor 22 and capacitor 25 are equal. An equivalent voltage is maintained on capacitors 21 and 25 at all times since the amplifier input (point 31) essentially is at ground potential for the typical operational amplifier. Although capacitor 25 is being charged, it will have no effect on the loop filter 8. Since resistors 17 and 22 are in parallel, the effective series resistance between input 15 and point 31 is relatively low. Since equivalent voltages appear on capacitors 21 and 25 at all times, bandwidth switching may be done at any time with little or no transient effects, and therefore, without the usual loss of loop lock.

Actual switching may be accomplished by relay 32 which transfers relay contact 23 from contact 24 to inactive contact 33 and also transfers contact 27 from contact 28 to contact 34, upon being energized. Closing contact 27 to contact 34 will effect a shunt connection of capacitors 21 and 25, thereby changing the capacitive component of the feedback network. As a result, the bandwidth will be narrowed. Relay 32 may be energized by closing switch 35 which will energize the relay coil from a suitable power source such as indicated by battery 36. As was mentioned hereinabove, switch 35 may be closed by a "signal present" detector which automatically narrows the bandwidth after signal acquisition.

Figure 3:
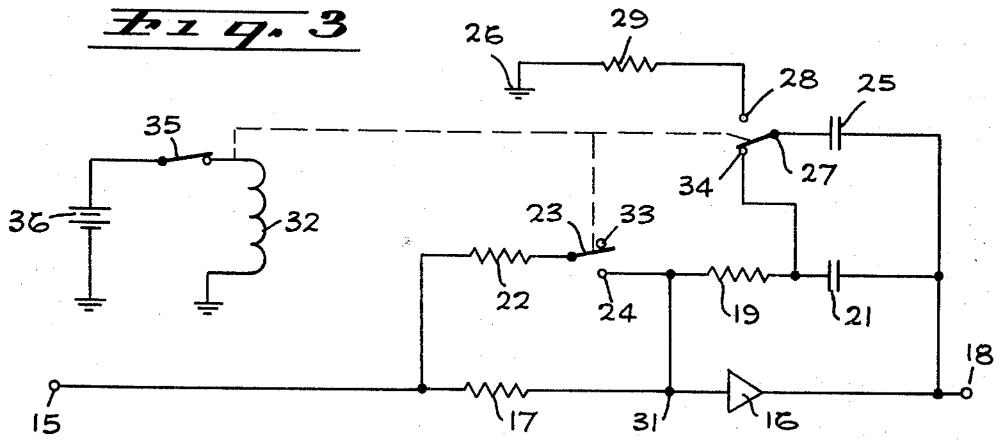
FIGURE 3 illustrates the circuit of FIGURE 2 switched to the condition required to establish a narrower bandwidth.

The wide bandwidth condition for signal acquisition is illustrated in FIGURE 2 and has been discussed above. The transfer to a narrow bandwidth condition to improve the signal-to-noise ratio, following signal acquisition, is shown in FIGURE 3. Upon closing switch 35, relay 32 will be energized and transfer contact 27 to contact 34, and contact 23 to inactive contact 33. This mode of operation is illustrated in FIGURE 3. In this mode, resistor 22 is taken out of the circuit so that it will no longer be in parallel with resistor 17. Therefore, the series resistance between input 15 and point 31 is increased. Capacitors 21 and 25 are placed in parallel in this operating mode. As a result, there will be a substantial change in bandwidth due to the increased resistance 17 and the increased capacitance (capacitor 21 and 25 in parallel) in the filter loop. However, in either mode of operation, the voltage on capacitors 21 and 25 is the same, thereby preventing a spurious transient from occurring during a change from one mode to the other.

The output 18 is, for a typical operational amplifier, of such low impedance that the requirement for driving the added load of capacitor 25 and resistor 29 is of no consequence as long as resistor 29 is of reasonable value as compared to the value of the operational amplifier's 16 output impedance.

Since certain changes may be made in the above described circuit without departing from the scope of the invention herein involved, it is intended that all matter contained in the above description and as shown in the accompanying drawings shall be interpreted as illustrative and not in a limiting sense.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims.

What is claimed is:

1. In a phase locked-loop arrangement of the type including a phase detector, oscillatory means and an operational amplifier having an output terminal connected to said oscillatory means, an input terminal of said amplifier connected through a first resistor to the output of said phase detector and a second resistor and a capacitor connected in series between the input and output terminals of said amplifier the improvement comprising:

a third resistor and a second capacitor; and means including switch means switchable between first and second positions for connecting said second capacitor and said third resistor in series between the output terminal of said amplifier and a reference potential when said switch means is in said first position and for connecting said second capacitor in parallel with said first capacitor when said switch means is switched to said second position, with the potentials across said first and second capacitors being substantially equal.

2. The improvement as recited in claim 1 wherein the time constant of said second resistor and first capacitor is substantially equal to the time constant of said third resistor and second capacitor, to control the potentials across said first and second capacitors to be substantially equal at the time said switch means is switched from said first to said second position.

3. The improvement as recited in claim 2 wherein said reference potential is ground, substantially equalling the the potential at the input terminal of said amplifier.

4. The improvement as recited in claim 2 further including a fourth resistor coupled to said switch means which connects said fourth resistor in parallel with said first resistor when said switch means is in said first position.

5. The combination comprising:

an amplifier having an input terminal connected to one end of a first resistor whose other end is adapted to be connected to a source of signals for said amplifier, said amplifier further including an output terminal and a first capacitor and second resistor connected in series between said output and input terminals;

a third resistor and a second capacitor; and means including switch means switchable between first and second positions for connecting said second capacitor and said third resistor in series between the output terminal of said amplifier and a reference potential when said switch means is in said first position and for connecting said second capacitor in parallel with said first capacitor when said switch means is switched to said second position, with the potentials across said first and second capacitors being substantially equal, wherein the time constant of said second resistor and first capacitor is substantially equal to the time constant of said third resistor and second capacitor, to control the potentials across said first and second capacitors to be substantially equal at the time said switch means is switched from said first to said second position.

6. The improvement as recited in claim 5 further including a fourth resistor coupled to said switch means which connect said fourth resistor in parallel with said first resistor when said switch means is in said first position.

7. The improvement as recited in claim 6 wherein said reference potential is ground, substantially equalling the potential at the input terminal of said amplifier.

8. The improvement as recited in claim 5 wherein said reference potential is ground, substantially equalling the potential at the input terminal of said amplifier.

References Cited

UNITED STATES PATENTS

| | | | |
|---|---|---|---|
| 2,434,299 | 1/1948 | Van Loon | 321—427 X |
| 2,460,900 | 2/1949 | Newbold | 325—427 |
| 3,259,856 | 7/1966 | Bott | 330—9 X |

ROY LAKE, *Primary Examiner.*

NATHAN KAUFMAN, *Examiner.*